M. Flannigan.
Bed Bottom.
No. 88,153.  Patented Mar. 23, 1869.
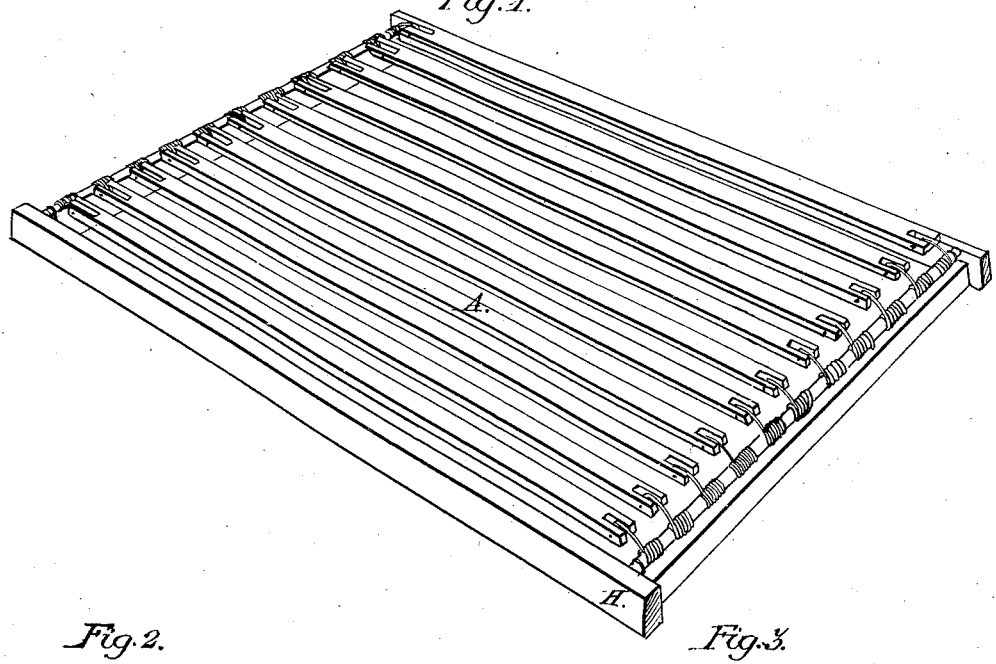
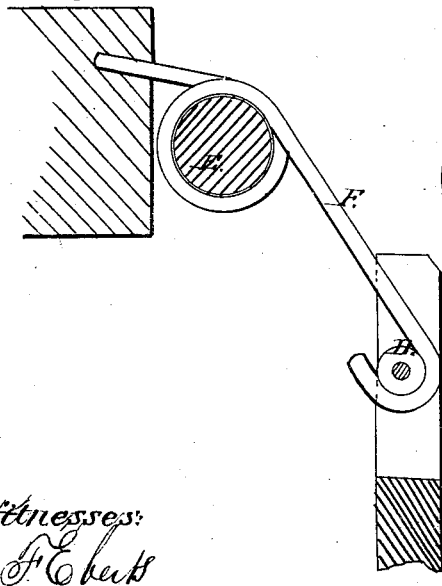
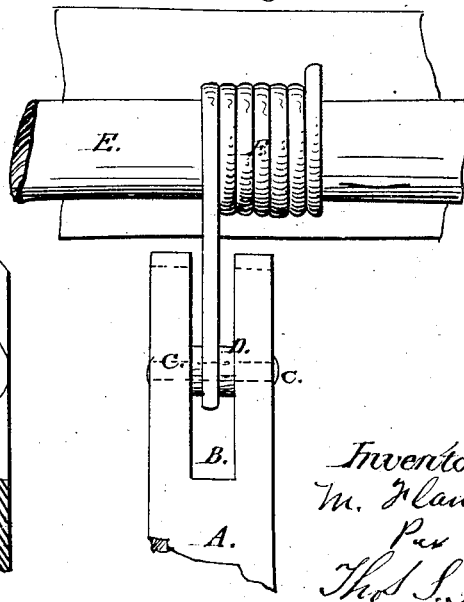
Witnesses:
H. F. Eberts
C. C. Cyde
Inventor:
M. Flannigan
Per Attorney
Thos. S. Sprague

MARK FLANIGAN, OF DETROIT, MICHIGAN.

Letters Patent No. 88,153, dated March 23, 1869.

IMPROVED SPRING-BED BOTTOM

The Schedule referred to in these Letters Patent and making part of the same.

*To whom it may concern:*

Be it known that I, MARK FLANIGAN, of Detroit, in the county of Wayne, and State of Michigan, have invented a new and useful Improvement in Spring-Bed Bottoms; and I do declare that the following is a true and accurate description thereof, reference being had to the accompanying drawings, and to the letters of reference marked thereon, and being a part of this specification.

Figure 1 is a perspective view of my invention.
Figure 2 is a side view of my improvement.
Figure 3 is a top view of the same.
Like letters indicate like parts.

The object of this invention is to so construct a bed-bottom that will not only be economical to build, but that will be elastic, and noiseless in operation.

It consists of longitudinal slats, A, provided, at each end, with slots B, through which pass rivets, or bolts C, upon which are sleeved, within the slots, the elastic bands D, made of rubber, or other suitable material, which completely cover those portions of the rivets, or bolts C, which are exposed within the slots.

E is a rod, upon which are slipped the helical, or spiral springs F, which may be single or double, and which are provided with hooks G, which engage with and hook upon the elastic bands sleeved on the bolts which pass through the slots at the end of the slats.

The rods E are attached to the end-bars of a proper frame H, the whole forming an economical, elastic, and noiseless bed-bottom.

What I claim as my invention, and desire to secure by Letters Patent, is—

The rivet, or bolt C, passing through slot B, and covered by an elastic sleeve, D, in combination with the springs F, with hooks G, and round bars E, when arranged, constructed, and operating as herein shown and described.

MARK FLANIGAN.

Witnesses:
H. F. EBERTS,
G. C. HYDE.